United States Patent [19]
Hegler

[11] B 3,924,992
[45] Dec. 9, 1975

[54] APPARATUS FOR MANUFACTURE OF PARTITIONED PLASTIC TUBING

[76] Inventor: Wilhelm Hegler, Goethestr. 2, Bad Kissingen, Germany

[22] Filed: July 25, 1972

[21] Appl. No.: 274,945

[44] Published under the Trial Voluntary Protest Program on January 28, 1975 as document no. B 274,945.

[30] Foreign Application Priority Data
July 31, 1971 Germany............................ 2138437

[52] U.S. Cl.............. 425/233; 425/319; 425/326 B; 425/381
[51] Int. Cl.²................... B29C 23/00; B29D 23/04
[58] Field of Search .......... 425/326, 319, 381, 466, 425/467, 326 B, DIG. 206, 387 B, 233

[56] References Cited
UNITED STATES PATENTS

| | | | |
|---|---|---|---|
| 3,496,605 | 2/1970 | Onaka...................................... | 18/14 |
| 3,577,935 | 5/1971 | Reinhart et al...................... | 425/326 |
| 3,677,676 | 7/1972 | Hegler................................. | 425/109 |
| 3,705,779 | 12/1972 | Van Zon............................ | 425/326 |
| 3,708,253 | 1/1973 | Lemelson........................ | 425/326 X |

FOREIGN PATENTS OR APPLICATIONS

| | | |
|---|---|---|
| 1,061,484 | 7/1959 | Germany |
| 1,245,582 | 7/1967 | Germany |

Primary Examiner—Richard B. Lazarus
Attorney, Agent, or Firm—Burgess, Dinklage & Sprung

[57] ABSTRACT

Partitioned plastic tubing characterized by a partition within the interior thereof extending in the longitudinal direction and joining at least two points on the internal circumference of the tubing; a process for the manufacture of such partitioned plastic tubing characterized by passing a molten plastic through an annularly shaped zone and cooling the same as it emerges from the zone while maintaining a separate flow of molten plastic on the interior thereof which joins at least two points on the circumference of the interior of the tube being formed; and apparatus for such process, which apparatus comprises an extrusion head, a mandrel therefor defining a passage through which molten plastic flows, and at least one radial discharge slit in the mandrel, which slit is in fluid communication with a reservoir for molten plastic.

6 Claims, 6 Drawing Figures

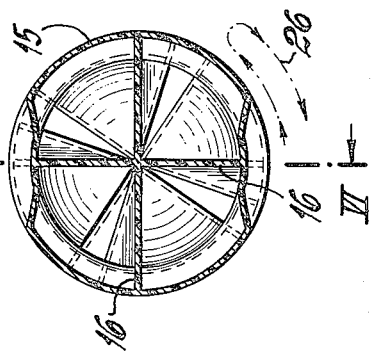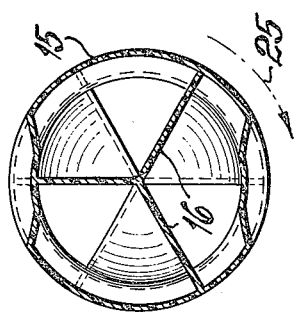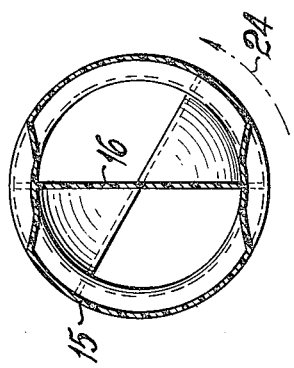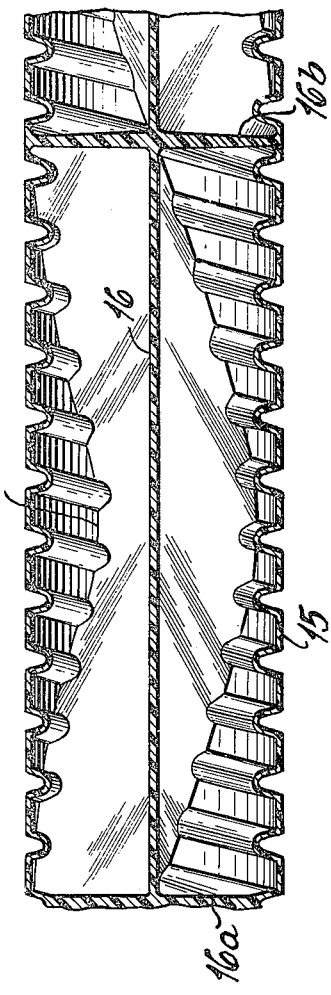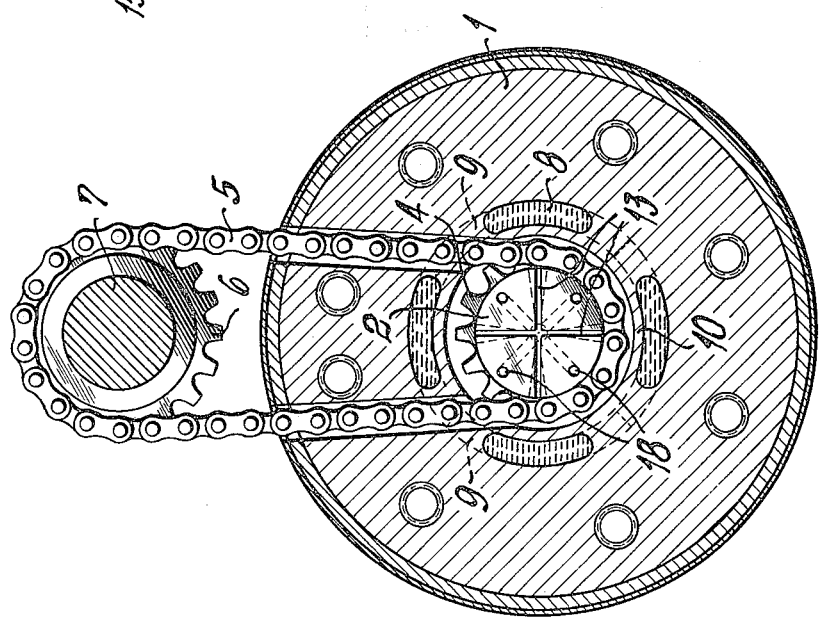

APPARATUS FOR MANUFACTURE OF PARTITIONED PLASTIC TUBING

BACKGROUND OF THE INVENTION

1. Field of the Invention

This invention relates to the manufacture of partitioned plastic tubing to define a plurality of interior fluid zones within the tubing, to the tubing itself and to an apparatus for the manufacture of such tubing. This invention is particularly directed to the manufacture of plastic tubing which is partitioned, wherein the partition is spirally twisted in the longitudinal direction. Additionally, this invention is directed to such partitioned tubing having an exteriorly shaped configuration such as an exterior corrugation.

2. Discussion of the Prior Art

For the biological purification of sewage, immersion coils are sometimes used, in which corrugated plastic tubes are wound spirally on drums such that, when the drum is rotated, the tube apertures take in water which then flows through the immersion coil on the principle of the screw pump, thus coming into contact with the biological coating that forms on the wall of the tube. To achieve the best possible action, it is desirable to create great turbulence in the water flowing through the immersion coil tubes, so as to bring it into intensive contact with the active surface, on the one hand, and on the other hand to supply the water constantly with air so as to sustain the required oxygen content. In order to achieve good turbulence it has been proposed that instead of the ordinary commercial plastic pipes which are provided with a fine, short-pitch corrugation, a coarse, multiple helix be used having a long pitch. The manufacture of such tubing, however, involves appreciable difficulty on account of the undercutting that is involved in steep thread pitches.

Another possibility for creating good turbulence in the water in the tubes consists in providing within the tube one or more radial cross walls which are not rectilinear but are given a helical twist, so that each tube is divided into a plurality of partial tubes — at least two — which are not round and which are spirally twisted.

SUMMARY OF THE INVENTION

Broadly, this invention contemplates an improvement in the apparatus for the manufacture of of plastic tubing, which tubing is partitioned on the interior thereof, which apparatus comprises an extrusion head and a mandrel therefor defining a passage through which molten plastic flows, the improvement comprising at least one radial discharge slit in said mandrel, which slit is in fluid communication with a reservoir for molten plastic. Preferably, the device is in association with a mold train disposed in a downstream relationship to the extrusion head which operates to form the extruded tube such that it has the desired exterior shape, said mold train being in association with means for aspirating air from closed molds in the mold train. Desirably, the apparatus includes means for rotating the mandrel about its common axis with the axis of the plastic tube to be formed.

The present invention is also directed to the so formed plastic tube having a partition within the interior thereof extending in the longitudinal direction. The plastic tube can have a plurality of partitions, and the partitions can be spirally twisted. When spirally twisted, they are made from an apparatus provided with means for rotating the mandrel.

Also contemplated herein is a process for producing a partitioned plastic tube which comprises passing a molten plastic through an annularly shaped zone, cooling the same as it emerges from said zone while maintaining a separate flow of molten plastic on the interior thereof which joins at least two points on the circumference of the interior of said tube.

Generally speaking, the extrusion of plastic tubing from a device including a stationary member and an interior mandrel positioned to define an annularly shaped zone is known. Additionally, the use of a mold train in association with an apparatus for forming plastic tubing is known. Reference should be made to Ser. No. 001,933, filed May 11, 1970, now U.S. Pat. No. 3,677,676 of July 18, 1972. Copending application Ser. No. 127,757 of Mar. 24, 1971, owned by the owner hereof, also contains relevant disclosure on a process for forming plastic tubing which is partially corrugated. The disclosures therein, by the same inventor as the herein subject matter, are hereby incorporated herein by reference. The subject invention, unlike the inventions disclosed therein, is directed specifically to the manufacture of plastic tubes which are partitioned and especially plastic tubes having a spirally twisted partition.

To form this partition, the mandrel of the tube extrusion head has one or more radial slits for the discharge of the plastic. In accordance with the invention, the mandrel of the extrusion head can be rotatable in relation to the jacket thereof to form a spirally twisted partition, and the extrusion head is followed by a train of shell molds in which the air is exhausted from the closed molds. The rotatable mandrel is advantageously mounted in ball or roller bearings, and one or more chain drive sprocket wheels are mounted on its rearward end. Within the extrusion heads the plastic flows under very high pressures up to several hundred kiloponds per square centimeter, and therefore, all joints between the individual parts of the extrusion head must be very carefully sealed. In the apparatus in accordance with the invention, special attention must be devoted to sealing off the chamber between the rotatable mandrel and the stationary jacket, which contains the bearings and sprockets, from the channel through which the plastic flows. This can be accomplished by means of a lip which is urged against the mandrel by the pressure of the plastic. The material for this lip may advantageously be a sufficiently ductile metal, so that the lip will contact the rotatable mandrel over a sufficiently broad area and provide a reliable seal so that no plastic can penetrate into the chamber containing the bearings and the driving means. For the lubrication of the bearings and of the drive sprockets, this chamber is best filled with a lubricant, and the lubricant must have good lubricating qualities at the temperature of the softened plastic.

To prevent the extruded tube from collapsing and assure that it will make good contact with the molds in the mold train under the action of the vacuum applied to its exterior, it is necessary to feed supporting air to the interior of the tube. For this purpose, the rotatable mandrel has longitudinal bores which open at the extrusion nozzle into the individual compartments of the extruded tube, and which at the opposite end, in the center of the mandrel, communicate with the chamber containing the bearings and the sprockets. At the same time, the quantity of lubricant contained in this chamber must be such that the lubricant level will be below the entrance aperture of the supporting air bore. To prevent lubricant from flowing into the aperture of the supporting air bore, it is desirable to provide a drip ring at the rearward end of the rotatable mandrel, so that lubricant entrained by the rotation of the mandrel will not flow into the supporting air bore.

A great amount of force is required for the rotation of the mandrel on account of the viscosity of the plastic which is forced through the annular gap between the mandrel and the jacket. It is desirable, therefore, to provide a plurality of sprockets on the mandrel, which are driven by chains which pass through bores in the commonly streamlined supports which bear the housing containing the bearings and sprockets.

The plastic tube emerging from the extrusion head enters in a known manner into a train of continuously circulating shell molds from which the air is aspirated after the molds have closed, so that the outer wall of the tube that has formed conforms to the wall of the molds. The molds may be provided in a known manner with transverse grooves for the production of a tube provided with transverse grooves which is sufficiently flexible to be wound onto the immersion coil cylinder. The molds, however, may also be smooth internally for the production of a smooth, less flexible tube if this is desired.

BRIEF DESCRIPTION OF DRAWINGS

The invention can be more readily understood and appreciated when reference is made to the accompanying drawings, in which:

FIG. 2 is a cross sectional elevation taken along the line II—II of FIG. 1, the rotatable mandrel being represented in a front elevation in FIG. 2 rather than in cross section;

FIG. 3 is a cross sectional view taken through a tube manufactured by means of the process and apparatus of the invention;

FIG. 4 is a cross section of another tube manufactured by the process and apparatus of the invention;

FIG. 5 is a cross sectional view of still another tube manufactured by means of the process and apparatus of the invention; and FIG. 6 is a longitudinal cross section taken along the line VI—VI of FIG. 5.

DESCRIPTION OF SPECIFIC EMBODIMENT

Figure 1:
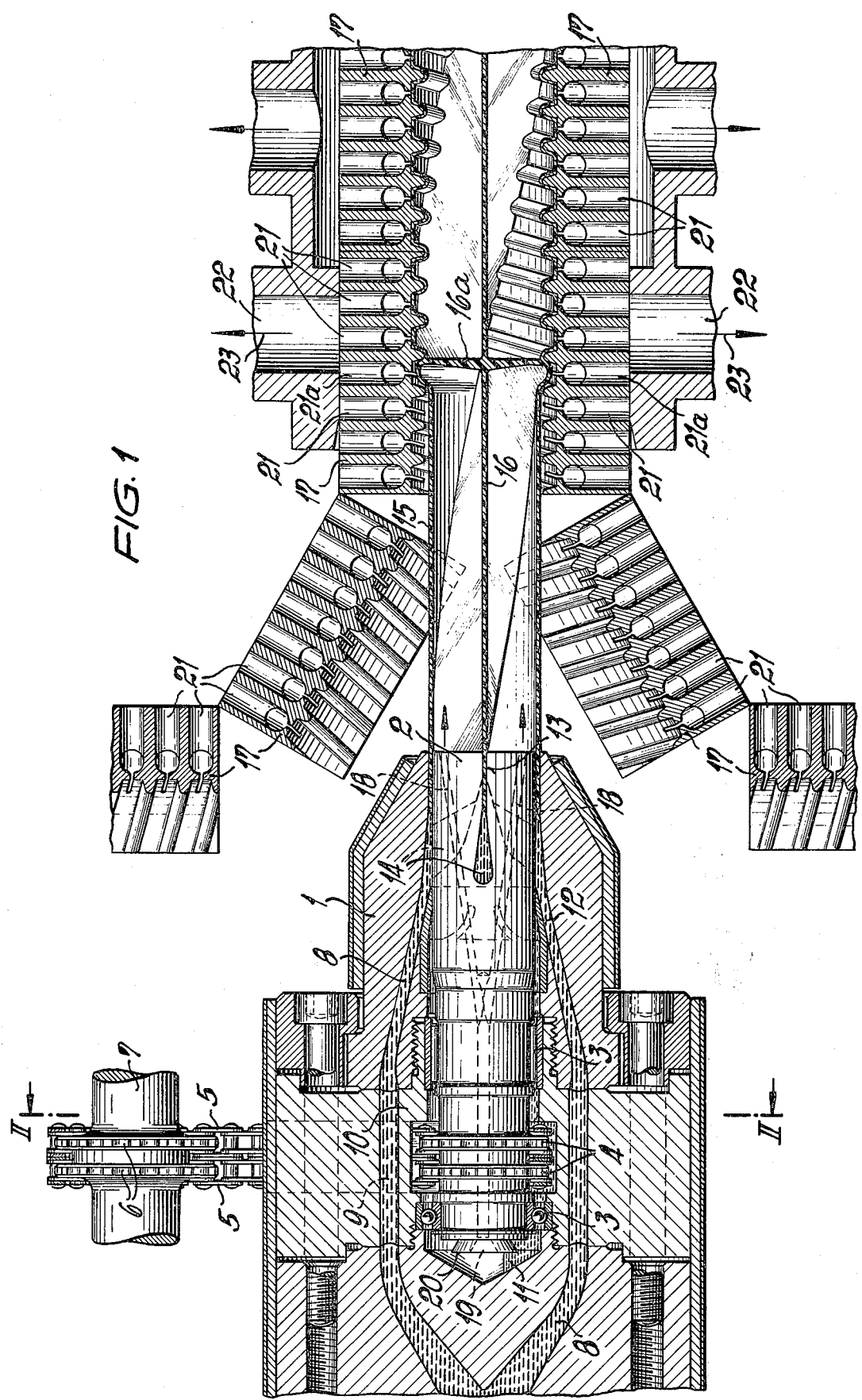
FIG. 1 is a cross sectional elevation of the apparatus of the invention showing the extrusion head toward the left of the drawing and the mold train to the right downstream thereof.

In the apparatus of FIGS. 1 and 2, the extrusion head consists of the stationary part 1 and the mandrel 2 which is rotatably mounted in the ball bearings 3. On the mandrel 2 there are mounted two chain sprockets 4 which are driven by chains 5 and sprockets 6 which are disposed on a motor-driven shaft 7. The stream of plastic 8 is forced by a screw (not shown) in a conventional manner into the extrusion head. The chains 5 are passed through hollow mandrel supports 9 which are streamlined on their exterior in the usual manner. These mandrel supports bear the stationary mandrel housing 10 which receives the ball bearings 3. To lubricate the ball bearings and sprockets and chains, the chamber between the rotatable mandrel 2 and the mandrel housing 10, as represented in FIG. 1, is partially filled with a lubricant 11.

To prevent the plastic, which is under high pressure, from penetrating into the chamber between the rotatable mandrel 2 and the mandrel housing 10, a movable annular lip 12 terminating in a thin tapered edge is provided on the mandrel housing, and is forced by the pressure of the plastic against the rotatable mandrel 2.

The rotatable mandrel 2 has two discharge slits 13 at right angles to one another, which communicate through passages 14 with the external plastic stream. At the discharge end of the extrusion device a cylindrical plastic tube 15 thus emerges, which is divided by two partitions 16 at right angles to one another into four compartments. Inasmuch as the mandrel 2 is rotated during the extrusion process, these partitions are spirally twisted.

The tube 15 emerging from the extrusion apparatus in the hot, plastic state then enters in a known manner into a train of molds formed each by two shells 17 which make up the hollow form. The shells are continuously circulated in the usual manner and move together with the plastic tube from left to right in FIG. 1. The inside of the shells is also provided in a known manner with transverse grooves from which the air is aspirated so that the plastic tube is pressed into the grooves in the molds by the internal air pressure. In order to maintain the atmospheric pressure in the compartments within the plastic tube, longitudinal bores 18 are provided in the rotatable mandrel 2, and their aperture 19 at the rearward end of the rotatable mandrel 2 opens into the chamber between the rotatable mandrel and the mandrel housing 10.

As shown in FIG. 1, the aperture 19 is above the level of the liquid lubricant 11 and is surrounded by an annular drip ring 20 which assures that lubricant will not get into the aperture 19. This chamber between the rotatable mandrel and the mandrel housing communicates with the outside air through the openings through which the chains 5 pass, so that air flow through the passages 18 under atmospheric pressure, supporting air, into the interior of the plastic tube.

Air is aspirated from the molds, as indicated by the arrows 23. Aspiration begins for each individual groove in the molds as soon as the vacuum passage 21 associated with this groove comes into communication with the main vacuum passage. When the molds are in the position represented in FIG. 1, aspiration into vacuum passage 21a has just begun. One of the two partitions 16 is cut at this point in FIG. 1, i.e., this partition is just parallel to the plane of the drawing at the aspiration point, and it can be seen that, upon the aspiration of the plastic tube into the groove of the mold, this partition undergoes a slight stretching. As the molds continue on their course, they are cooled in a portion of the mold train (not shown) and they open when the plastic tube that has formed has cooled below the softening temperature. By the rotation of the mandrel it is brought about, as illustrated, that the partitions 16 are twisted spirally, so that the liquid to be purified, flowing through the four divisions of the tube, is intensely agitated and mixed with air, the agitation being further intensified by the transverse grooves which simultaneously assure that the tube will be flexible enough to be wound on an immersion coil drum.

The apparatus of FIGS. 1 and 2 produces a tube having two partitions at right angles to one another. FIG. 3 shows how the tube may also have only one partition, only one slit, of course, being provided in the rotatable mandrel 2. Also, however, as shown by FIG. 4, three partitions may be produced by having three radial slits in the rotatable mandrel.

The direction of rotation of the mandrel may be leftward, as indicated by the arrow 24 in FIG. 3, or rightward, as indicated by the arrow 25 in FIG. 4. The direction of rotation may also alternate, as indicated by the arrow 26 in FIG. 5. This produces a tube, as shown in FIG. 6, whose partitions spiral alternately to the right and to the left. At the left end of FIG. 6, the partition 16a is just parallel to the plane of the drawing, and up to the turning point 26a it is a leftwardly spiralling partition, and beyond turning point 26a it is a rightwardly spiralling partition, the partition being again parallel to the plane of the drawing and cut through at point 16b.

The tubes manufactured with the apparatus of the invention and having spirally twisted partitions are usable not only for immersion coils but also for other purposes. For example, clusters of straight tubes may be used, through which the water to be purified flows by gravity or by difference of pressure. The tubes, however, may also be used for the transportation of liquids containing solids where it is important to prevent the matter suspended in the liquids from settling in the tubes.

In the foregoing description, reference has been made to providing at least one slit in the rotatable mandrel. Generally speaking, the slit passes through the center of the rotating mandrel or emanates from the center. It should be understood, however, that the rotating mandrel can be provided with a slit which is adapted to join a partition at two points along the circumference of the interior of a plastic tube, which partition does not pass through the center of the plastic tube. Thus, the slit can appear to be the secant of a circle, which secant does not pass the center of the circle and thus defines an arc of the circle by intersecting the circumference at two points.

Generally speaking, it will be seen that the process and apparatus can be used in respect of any plastic material, both natural and synthetic. Particularly contemplated are synthetic plastic substances which can be heated to a molten state and cooled into a separate form. Such include, in particular, thermoplastic materials, such as vinyl chloride polymers, chlorinated polyethylene, postchlorinated polyvinyl chloride, polymers of the acrylate family, acrylonitrile polymers, styrene polymers, olefin polymers and copolymers, especially α-olefin polymers, polyesters, nylon, cellulose acetate, polymers derived from phthalic acid or anhydride, or copolymers thereof, polyamides, and any other substance which can be melted and formed upon cooling to a desired shape. It is apparent that the nature of the material utilized in the process and formed into the partitioned tube is immaterial to the nature of the invention.

Terms and expressions used herein have been used as terms of description and not of limitation, as there is no intention in the use of such terms and expressions of excluding any equivalents or portions thereof, as various modifications and departures will become apparent to one skilled in the art.

What is claimed is:

1. In an apparatus for the manufacture of plastic tubing comprising an extrusion head, a generally annular orifice through which molten plastic can flow, said annular orifice in fluid communication with a reservoir and a mandrel disposed within said extrusion head around which plastic flows, the improvement which comprises at least one radial discharge slit in said mandrel, through which molten plastic can flow to define a wall which slit is in fluid communication with a reservoir for molten plastic and a mold train disposed in a downstream relationship to said extrusion head, means for aspirating air from closed molds in said mold train and means for rotating said mandrel about its common axis with the longitudinal axis of the plastic tube to be formed.

2. An improvement according to claim 1, wherein the rotatable mandrel is mounted in ball or roller bearings within a stationary member which defines the exterior wall of the plastic tubing to be formed and bears at least one drive sprocket.

3. An improvement according to claim 2, wherein the bearings and drive sprocket are maintained in a chamber sealed between the rotatable mandrel and the annular orifice through which the plastic flows by a lip which is urged against the mandrel by the pressure of the plastic.

4. An improvement according to claim 3, wherein the chamber receiving the bearings and drive sprocket is partially filled with lubricant.

5. An improvement according to claim 1, wherein said mandrel has a longitudinally positioned bore for the delivery of supporting air, the air entrance aperture of said bore opening into the chamber containing the bearings and sprocket above the level of lubricant therein.

6. An improvement according to claim 5, wherein said air entrance aperture is surrounded by a drip ring.

* * * * *